(No Model.) 2 Sheets—Sheet 1.

R. BROWN.
WHEEL.

No. 287,801. Patented Nov. 6, 1883.

Attest
J. Richards
Eugene Daniels

Robert Brown,
Inventor,
by Henry Millward
his Attorney (No Model.) 2 Sheets—Sheet 2.

R. BROWN.
WHEEL.

No. 287,801. Patented Nov. 6, 1883.

Attest:
J. Richards
Eugene Daniels

Robert Brown,
Inventor.
by Henry Millward,
his Attorney.

UNITED STATES PATENT OFFICE.

ROBERT BROWN, OF SPRINGFIELD, OHIO.

WHEEL.

SPECIFICATION forming part of Letters Patent No. 287,801, dated November 6, 1883.

Application filed April 7, 1883. (No model.)

*To all whom it may concern:*

Be it known that I, ROBERT BROWN, of Springfield, county of Clarke, State of Ohio, have invented a new and useful Improvement in Wheels, of which the following is a specification.

Figure 3:
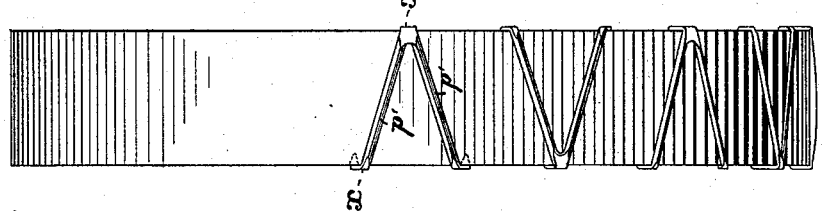
Figure 2:
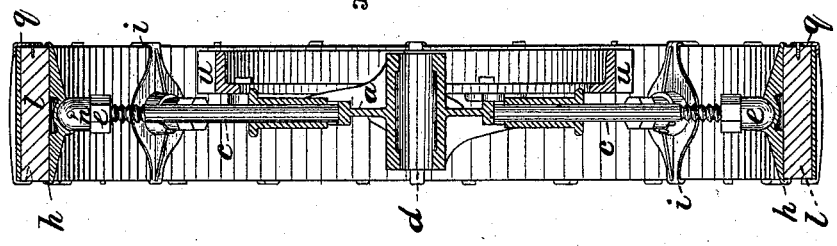
Figure 1:
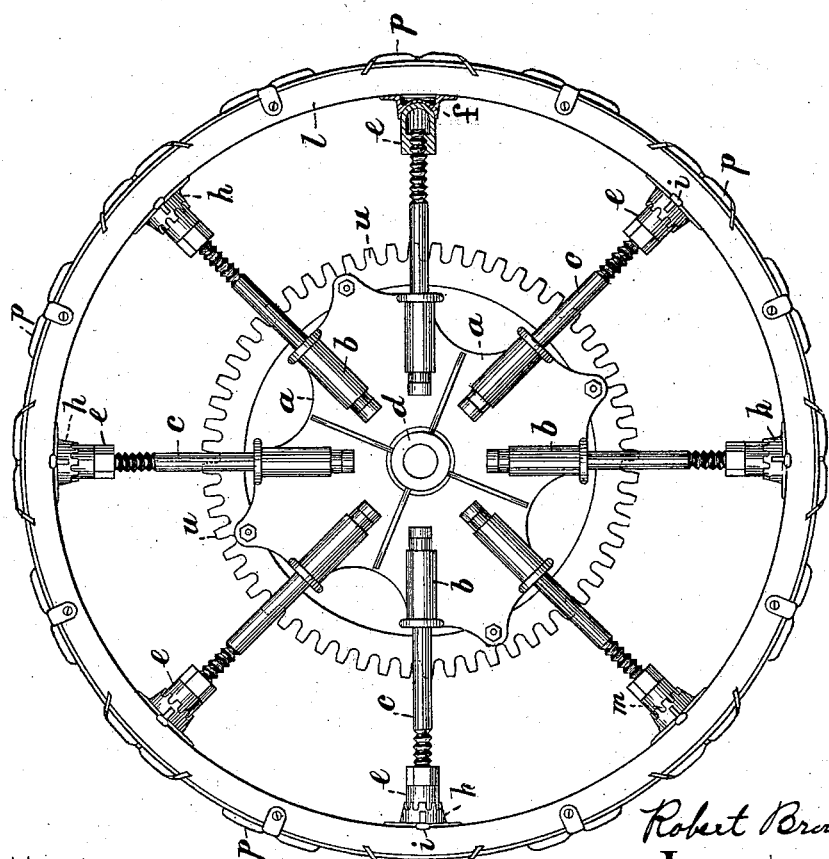
Figure 4:
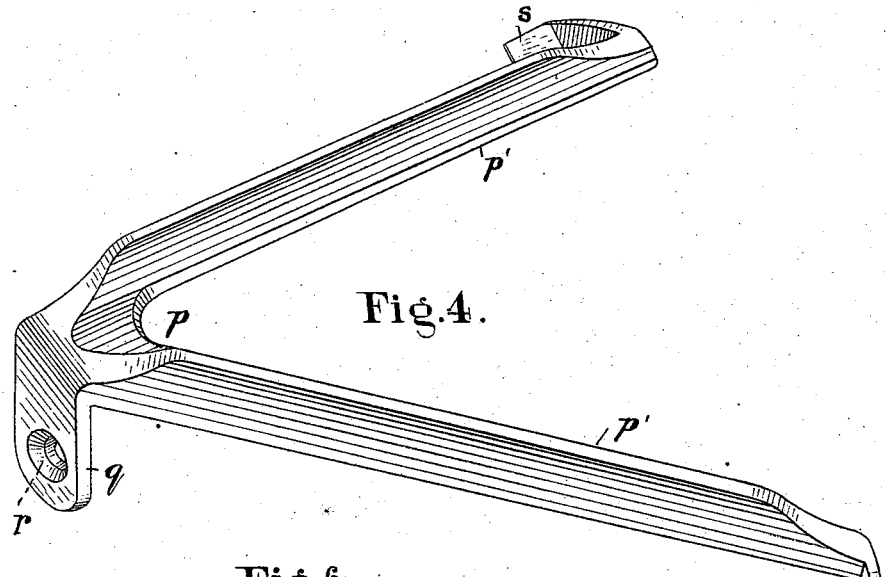
Figure 6:
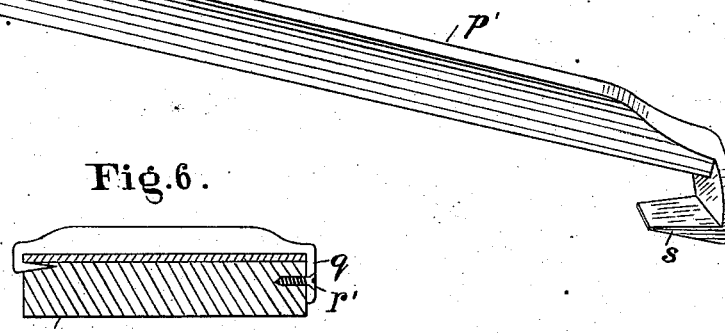
Figure 5:
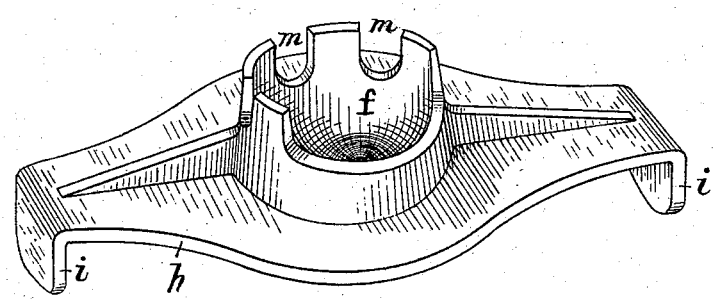

In the accompanying drawings, Figure 1 is an elevation of a wheel embodying my improvements. In this figure I have represented one of the tightening-nuts with its cupped lug in section for purposes of perspicuity. Fig. 2 is a transverse section of the same. Fig. 3 is a transverse elevation, representing a number of the traction-pieces removed, as they may be when it becomes desirable to use a belt upon the wheels, to illustrate the working of the machine to which they are attached at fairs or for other show purposes. Fig. 4 is a perspective view of a detached traction-piece. Fig. 5 is a perspective view of the cupped lug against which the nut of the threaded spoke bears; and Fig. 6 is a partial sectional elevation through line *x x* of Fig. 3, illustrative of the manner of securing the traction-pieces to the felly and tire.

On each of the figures of these drawings letters of like character indicate corresponding parts.

This invention has for its object cheapness of construction and ready means for adjustment of parts, whereby the wheel can be kept in a rigid state and made to hold together the several parts that compose the wheel without the necessity for punching and drilling, except where the ends of the tire are riveted together, and even this may be dispensed with should the ends be welded instead of riveted.

The wheel is constructed with a metallic center, *a*, provided with pockets *b*, for the reception of spokes *c*, and a hub, *d*, for the reception of an axle. The spokes *c* are plain at one end and abut against the bottom of the pockets *b* at the other end. These spokes are threaded and provided with nuts *e*, that fit into cups *f*, formed in the lugs *h*. The lugs *h* are provided with projecting ears *i*, that fit over both sides of the felly *l*, and serve to keep said lugs from lateral movement. The lugs *h* are also provided with apertures *m*, into which pins may be inserted to pass through the perforation *n* in the nut *e*, for the purpose of locking said nut to its place, and thereby prevent unscrewing.

The traction-pieces *p* are triangular in shape. At the apex of said triangle a lug, *q*, is formed, said lug being provided with a perforation, *r*. Hooks *s* are formed on each of the sides *p'*. In putting the traction-pieces in place upon the wheel, the hooks *s* are driven between the inner surface of the tire and outer surface of the felly until they come home. Then the lug *q* is brought down in the manner illustrated by Fig. 6, and a screw, *r'*, put into the felly, holds the traction-piece to place.

In the wheel I have illustrated I have represented a gear-wheel, *u*, attached to the center piece, *a*. I have done this to show how it could be adapted to use for harvesting self-binders or traction-engines; for sulky-plows, hay-rakes, cultivators, &c., this gear-wheel could be dispensed with.

With this construction and arrangement it is obvious that punching of tire for traction-pieces and boring of felly to receive the ends of same are entirely dispensed with, and yet the wheel will be perfectly rigid and not likely to get out of order. Besides, the spokes can be adjusted to suit the varying conditions of the felly due to exposure to the weather.

Having thus described my invention, what I claim as new, and desire to secure by Letters Patent, is—

1. The traction or vehicle wheel herein described, essentially consisting of the web *a*, constructed with hub *d* and radial pockets or fixed tubes *b*, the spokes *c*, fitted in said pockets, and provided with screw-threaded outer ends and nuts, *e*, and the rim *l*, having lugs *h*, provided with ears *i*, and cups *f*, for receiving the nuts *e*, and suitable means for locking the nuts to said cups, substantially as described.

2. In a traction or vehicle wheel, the combination of the lugs *h*, having ears *i*, and cups *f*, provided with apertures or notches *m*, with the rim, the spokes provided with nuts seated in said cups, and suitable locking-pins, and the hub having pockets for the reception of the inner ends of the spokes, substantially as described.

3. In a traction-wheel, the traction-pieces $p'$ $p'$, having hooks $s$ $s$ and lugs $q$ $r$, substantially as described.

In testimony whereof I have hereunto set my hand this 6th day of March, 1883.

ROBERT BROWN.

Witnesses:
HENRY MILLWARD,
E. S. WALLACE.